United States Patent [19]

Johns

[11] 3,845,890
[45] Nov. 5, 1974

[54] GARMENT HOOK AND GARNISH MOLDING RETAINER
[75] Inventor: Harold W. Johns, Warren, Mich.
[73] Assignee: General Motors Corporation, Detroit, Mich.
[22] Filed: Nov. 23, 1973
[21] Appl. No.: 418,399

[52] U.S. Cl.............. 224/42.1 C, 52/37, 248/339, 296/1 R
[51] Int. Cl............................................ B60r 11/00
[58] Field of Search............... 296/1 R; 52/37, 716; 224/42, 42.1 C; 24/73 PM, 73 FT, 73 BC, 243 P, 252 SH; 248/339

[56] References Cited
UNITED STATES PATENTS
2,232,094 2/1941 Canfield.................... 224/42.1 C Primary Examiner—Robert G. Sheridan
Assistant Examiner—Donald W. Underwood
Attorney, Agent, or Firm—H. Furman

[57] ABSTRACT

The invention provides a garment hook having an integral retainer for attaching a garnish molding to the vehicle body. The garment hook has a body portion which extends through a rectangular opening in the garnish molding and into engagement with a vehicle body panel. A central aperture in the body portion receives a rivet or screw for attaching the body portion to the body panel. The body portion has an integral flange extending therefrom and conforming in shape with the opening in the garnish molding to hold the garnish molding against the vehicle body and conceal the rectangular opening in the garnish molding. A hook portion is integral with the body portion and extends upwardly therefrom above the top edge portion of the garnish molding and in spaced relation from the vehicle body to provide a hook for holding a garment. A leg integral with the body portion extends downwardly from the body portion and has its end adapted for engagement in the reversely bent lower edge portion of the garnish molding to thereby retain the lower edge portion of the garnish molding relative the vehicle body.

3 Claims, 4 Drawing Figures

PATENTED NOV 5 1974

3,845,890

GARMENT HOOK AND GARNISH MOLDING RETAINER

The invention relates to a garment hook for a motor vehicle and more particularly to a garment hook which includes an integral retainer for retaining a garnish molding on the vehicle body.

It is known in motor vehicle bodies to provide a plastic hook upon which a garment or garment hanger may be hung.

It is also known to provide a garnish molding on the vehicle body interior above the window opening and to attach the garnish molding to the vehicle body by spaced wire clips.

The present invention provides a garment hook which has an integral retainer for attaching the garnish molding to the vehicle body. The garment hook and molding retainer of the invention is adapted for use with a conventional garnish molding which is formed of extruded resilient plastic and has its edge portions reversely bent to receive a retaining clip. The garnish molding is conventionally attached to the vehicle body by spaced metallic retaining clips which are received in the reversely bent edge portions of the garnish molding. The garment hook of this invention replaces one of the wire retaining clips by providing integral means for assisting in retaining the garnish molding on the vehicle body.

The garment hook has a body portion which extends through a rectangular opening in the garnish molding and into engagement with a body panel. A central aperture in the body portion receives a rivet or screw for attaching the body portion to the body panel. The body portion has an integral flange extending therefrom and conforming in shape with the garnish molding to hold the garnish molding against the vehicle body. The flange of the body portion also conceals the rectangular opening in the garnish molding from view. A hook portion is integral with the body portion and extends upwardly therefrom above the top edge portion of the garnish molding to provide a hook for holding a garment or garment hanger. A leg integral with the body portion extends downwardly from the body portion and has inside the garnish molding its end adapted for engagement in the reversely bent lower edge portion of the garnish molding to thereby retain the lower edge portion of the garnish molding relative the vehicle body.

Referring to the drawings, FIG. 1 is a frontal elevation view of the garment hook and retaining clip;

Figure 1:
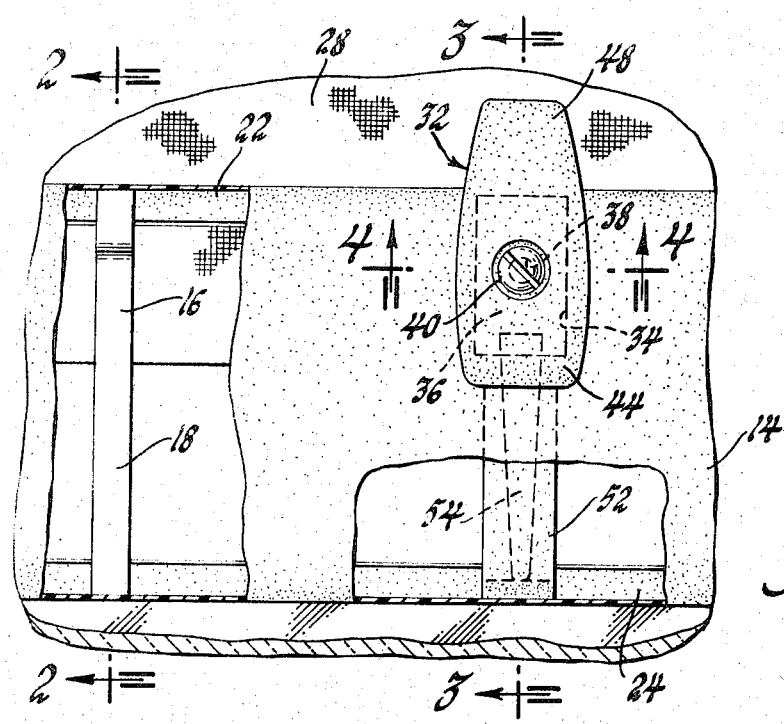
Figure 2:
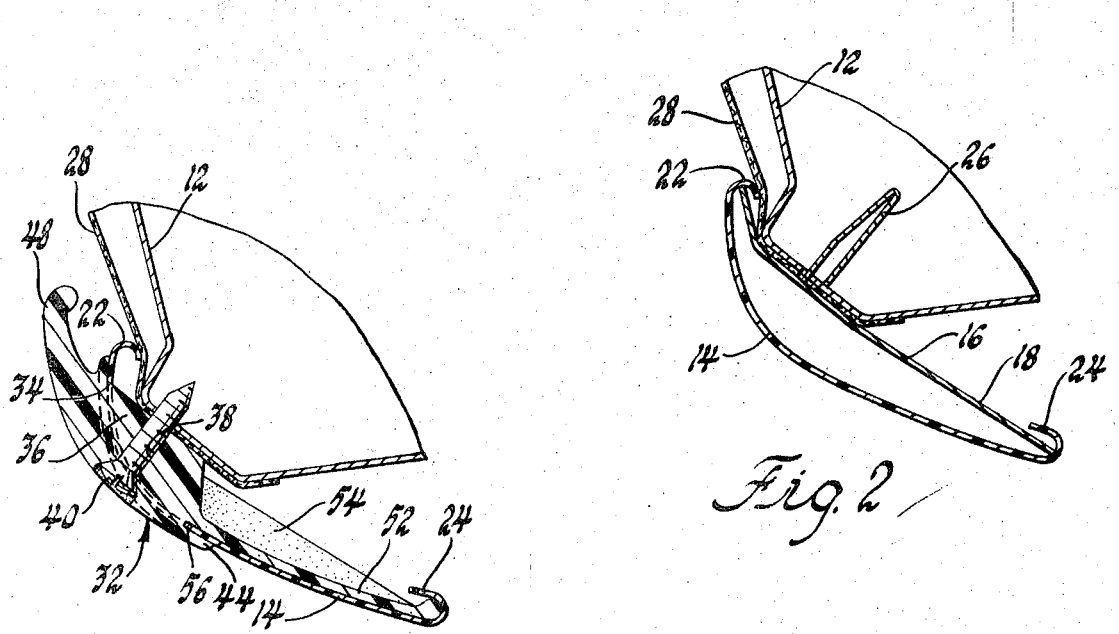
FIG. 2 is a section taken in the direction of arrows 2—2 of FIG. 1.

Referring to FIGS. 1 and 2, the vehicle body includes a roof structure having a roof inner panel 12. A conventional extruded resilient plastic garnish molding 14 is attached to the roof inner panel 12 generally in the area above the window. The garnish molding 14 is conventionally attached to the roof inner panel 12 by garnish molding clips 16 which are spaced along the garnish molding 14. A typical garnish molding clip 16 includes a vertically extending bar 18 which has its upper end received in a reversely bent upper edge 22 of the garnish molding 14 and a lower edge which is received in the reversely bent lower edge portion 24 of the garnish molding. A spring clip 26 is attached to the bar 18 and extends through a hole in the roof inner panel 12 to attach the bar 18 and garnish molding 14 to the roof inner panel and against the headlining 28.

Figure 3:
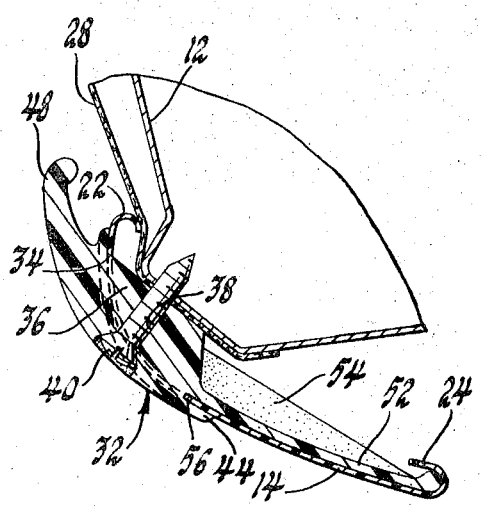
FIG. 3 is a section taken in the direction of arrows 3—3 of FIG. 1.
Figure 4:
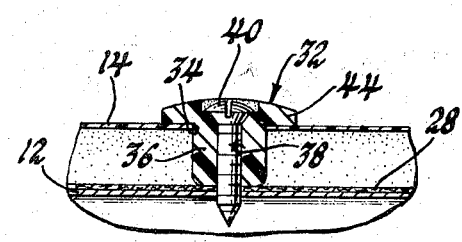
FIG. 4 is a section taken in the directions of arrows 4—4 of FIG. 1.

A garment hook and molding retainer shown generally at 32 is provided to permit a garment to be hung in the vehicle body and also cooperate with the spaced clips 16 to attach the garnish molding 14 to the vehicle body. As seen in FIGS. 1, 3 and 4 the garnish molding 14 has a rectangular opening 34 into which the garment hook and retainer 32 is inserted. The garment hook includes a body portion 36 which fits into the rectangular opening 34 and engages the roof inner panel 12. A central aperture 38 is provided in the body portion 36 and receives a screw or rivet 40 which attaches the garment hook to the roof inner panel 12. An integral flange 44 projects from the body portion 36 in the area generally surrounding the rectangular opening 34 of the garnish molding so as to engage the garnish molding 14 and thereby retain the garnish molding relative the roof inner panel 12. The flange 44 also conceals the opening 34 from view.

A hook portion 48 is integral with the body portion 36 and extends upwardly therefrom in spaced relation from the headlining 28 to provide a hook upon which a garment or a garment hanger may be hung.

The garment hook 32 also has a leg 52 which is integral with the body portion 36 and extends downwardly therefrom inside the garnish molding 14. The lower edge portion of the leg 52 is engaged in the lower reversely bent edge 24 of the garnish molding 14 so as to secure the lower edge portion of the garnish molding 14. Leg 52 has an integral stiffener 54. It will be seen that the body portion 36, flange 44, and leg 52 cooperate to provide downwardly opening slot 56 which captures a portion of the garnish molding 14 to prevent its movement inwardly, outwardly and upwardly.

Thus it is seen that a garment hook is provided having integral means for assisting in attaching a garnish molding to the vehicle body.

What is claimed is:

1. In combination with a vehicle body having a garnish molding with an opening therein, a garment hook comprising: a body portion adapted to be received in the opening in the garnish molding and having a central aperture for receiving means to fasten the body portion to the vehicle body, a hook portion integral with the body portion and extending generally upwardly in spaced relation from the vehicle body to be engageable by a garment, an elongated leg portion integral with the body portion extending substantially perpendicular to the longitudinal axis of the fastener means when the fastener means is inserted through said aperture and depending downwardly therefrom within the garnish molding, and means on the leg portion cooperating with means on the garnish molding to retain the garnish molding on the vehicle body.

2. In combination with a vehicle body having a garnish molding with a reversely bent edge portion and an opening therein, a garment hook comprising: a body portion adapted to be received in the opening in the garnish molding and having a central aperture for receiving a means to fasten the body portion to the vehicle body, integral flange means on the body portion overlying the garnish molding in the area thereof about the opening to retain the garnish molding on the vehicle body and conceal the opening, a hook portion integral with the body portion and extending generally upwardly in spaced relation from the vehicle body to form a hook for holding a garment, and an elongated leg portion integral with the body portion extending substantially perpendicular to the longitudinal axis of the fastener means when the fastener means is inserted through said aperture and extending downwardly therefrom inside the garnish molding and into engagement with the reversely bent edge portion of the garnish molding to retain the garnish molding on the vehicle body.

3. In a vehicle body having a garnish molding with a reversely bent edge portion and attached to the vehicle body by spaced attaching clips, a garment hook for aiding in the attachment of the garnish molding to the vehicle body, said garnish molding comprising: a body portion adapted to be received in an opening in the garnish molding and having a central aperture for receiving a means to fasten the body portion to the vehicle body, integral flange means on the body portion and contacting the garnish molding in the area thereof generally surrounding the opening to retain the garnish molding against the vehicle body and conceal the opening in the garnish molding, a hook portion integral with the body portion and extending generally upwardly in spaced relation from the vehicle body to form a hook for holding the garment, and an elongated leg integral with the body portion extending substantially perpendicular to the longitudinal axis of the fastener means when the fastener means is inserted through said aperture and extending downwardly therefrom within the garnish molding and into engagement within the reversely bent edge portion of the garnish molding, the body portion, flange means and leg cooperating to define a downwardly opening slot in which the garnish molding is captured.

* * * * *